(12) United States Patent
Curtis et al.

(10) Patent No.: US 8,411,587 B2
(45) Date of Patent: Apr. 2, 2013

(54) SYSTEM AND METHOD FOR CONFIGURING A NETWORK

(75) Inventors: William Curtis, Austin, TX (US); Yuan-Chang Lo, Austin, TX (US); Liam Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 929 days.

(21) Appl. No.: 12/029,153

(22) Filed: Feb. 11, 2008

(65) Prior Publication Data

US 2010/0027441 A1    Feb. 4, 2010

(51) Int. Cl.
    *H04L 12/28* (2006.01)
(52) U.S. Cl. .......................................... 370/254
(58) Field of Classification Search .................. None
    See application file for complete search history.

(56) References Cited

U.S. PATENT DOCUMENTS

| | | | | |
|---|---|---|---|---|
| 5,751,967 A | | 5/1998 | Raab et al. ............... | 395/200.58 |
| 6,226,751 B1 | | 5/2001 | Arrow et al. .................. | 713/201 |
| 6,286,038 B1 | | 9/2001 | Reichmeyer et al. ......... | 709/220 |
| 7,283,505 B1 | * | 10/2007 | Meenan et al. ............... | 370/338 |
| 2002/0176579 A1 | * | 11/2002 | Deshpande et al. .......... | 380/270 |
| 2003/0227911 A1 | * | 12/2003 | Trossen ........................ | 370/352 |
| 2004/0068653 A1 | * | 4/2004 | Fascenda ...................... | 713/168 |
| 2004/0077336 A1 | * | 4/2004 | Lauriol ......................... | 455/411 |
| 2004/0105434 A1 | * | 6/2004 | Baw .............................. | 370/355 |
| 2004/0121749 A1 | * | 6/2004 | Cui et al. .................. | 455/226.1 |
| 2004/0203783 A1 | * | 10/2004 | Wu et al. ...................... | 455/436 |
| 2004/0264395 A1 | * | 12/2004 | Rao ............................... | 370/311 |
| 2006/0116170 A1 | * | 6/2006 | Brahmbhatt et al. ......... | 455/560 |
| 2006/0246947 A1 | * | 11/2006 | Fujii et al. .................... | 455/557 |
| 2007/0140220 A1 | * | 6/2007 | Doradla et al. ............... | 370/352 |
| 2007/0199066 A1 | | 8/2007 | Smith et al. .................... | 726/15 |
| 2008/0137553 A1 | * | 6/2008 | Hsu et al. ...................... | 370/254 |
| 2009/0010230 A1 | * | 1/2009 | Lee et al. ...................... | 370/338 |
| 2009/0109897 A1 | * | 4/2009 | Woo .............................. | 370/328 |

* cited by examiner

Primary Examiner — Otis L Thompson, Jr.
(74) Attorney, Agent, or Firm — Baker Botts L.L.P.

(57) ABSTRACT

A system and method for configuring a network are disclosed. A method may include storing identifying information associated with one or more network devices on a computer-readable medium in an information handling system prior to delivery of the information handling system to a user. The method may also include determining whether the identifying information stored on the information handling system is associated with the network access point. The method may further include automatically configuring network parameters for communication between the network access point and the information handling system in response to a determination that the identifying information stored on the information handling system is associated with the network access point.

17 Claims, 4 Drawing Sheets

SYSTEM AND METHOD FOR CONFIGURING A NETWORK

TECHNICAL FIELD

The present disclosure relates in general to network configuration, and more particularly to a system and method for configuration of a network requiring little or no user input.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With recent advances in network technology and improved affordability of networking devices, information handling system users are increasingly implementing networks (e.g., local areas networks or LANs) that utilize wireless transmissions (e.g., wireless fidelity or "Wi-Fi") and wire-line transmissions in their homes and/or businesses. For example, users may implement a home or business network including an information handling system, one or more wireless-capable network devices, and a wireless access point communicatively coupled to the information handling system and network devices. Such a network may allow an information handling system (or a user thereof) to communicate with the one or more network devices via the wireless access point or vice versa.

However, despite the increasing popularity of home and business networking systems, configuration complexity of such systems has prevented widespread acceptance. While network installation and setup for experienced users has been greatly simplified with setup wizards and advances in usability features included in operating systems, network configuration remains a difficult challenge for many users, particularly home consumers. These configuration challenges lead to negative customer experience and numerous technical support calls. For example, one company has reported that it receives in excess of 20,000 technical support calls per day related to digital home products, the majority attributable to wireless access point installation and setup.

Accordingly, a need has arisen for systems and methods that allow implementation of network systems without the complexity incumbent in traditional approaches.

SUMMARY

In accordance with the teachings of the present disclosure, disadvantages and problems associated with implementing network systems may be substantially reduced or eliminated.

In accordance with an embodiment of the present disclosure, a system for configuring a network includes a network access point, and an information handling system communicatively coupled to the network access point. The information handling system may include a computer-readable medium having stored thereon identifying information associated with one or more network devices, the identifying information being stored in the computer-readable medium prior to delivery to a user. At least one of the network access point and the information handling system may determine whether the identifying information handling system is associated with the network access point. The network access point and the information handling system may cooperate to automatically configure network parameters for communication between the network access point and the information handling system in response to a determination that the identifying information stored on the information handling system is associated with the network access point.

In accordance with another embodiment of the present disclosure, a method for configuring a network is provided. The method may include storing identifying information associated with one or more network devices on a computer-readable medium in an information handling system prior to delivery of the information handling system to a user. The method may also include determining whether the identifying information stored on the information handling system is associated with the network access point. The method may further include automatically configuring network parameters for communication between the network access point and the information handling system in response to a determination that the identifying information stored on the information handling system is associated with the network access point.

In accordance with a further embodiment of the present disclosure, an information handling system may include a processor and a computer-readable medium communicatively coupled to the processor. The computer-readable medium may have data stored thereon prior to delivery to a user, the data including: (a) identifying information associated with one or more network devices; and (b) a program of instructions operable to, when executed, automatically configure network parameters for communication between the network access point and the information handling system in response to a determination that the identifying information stored on the information handling system is associated with the network access point.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
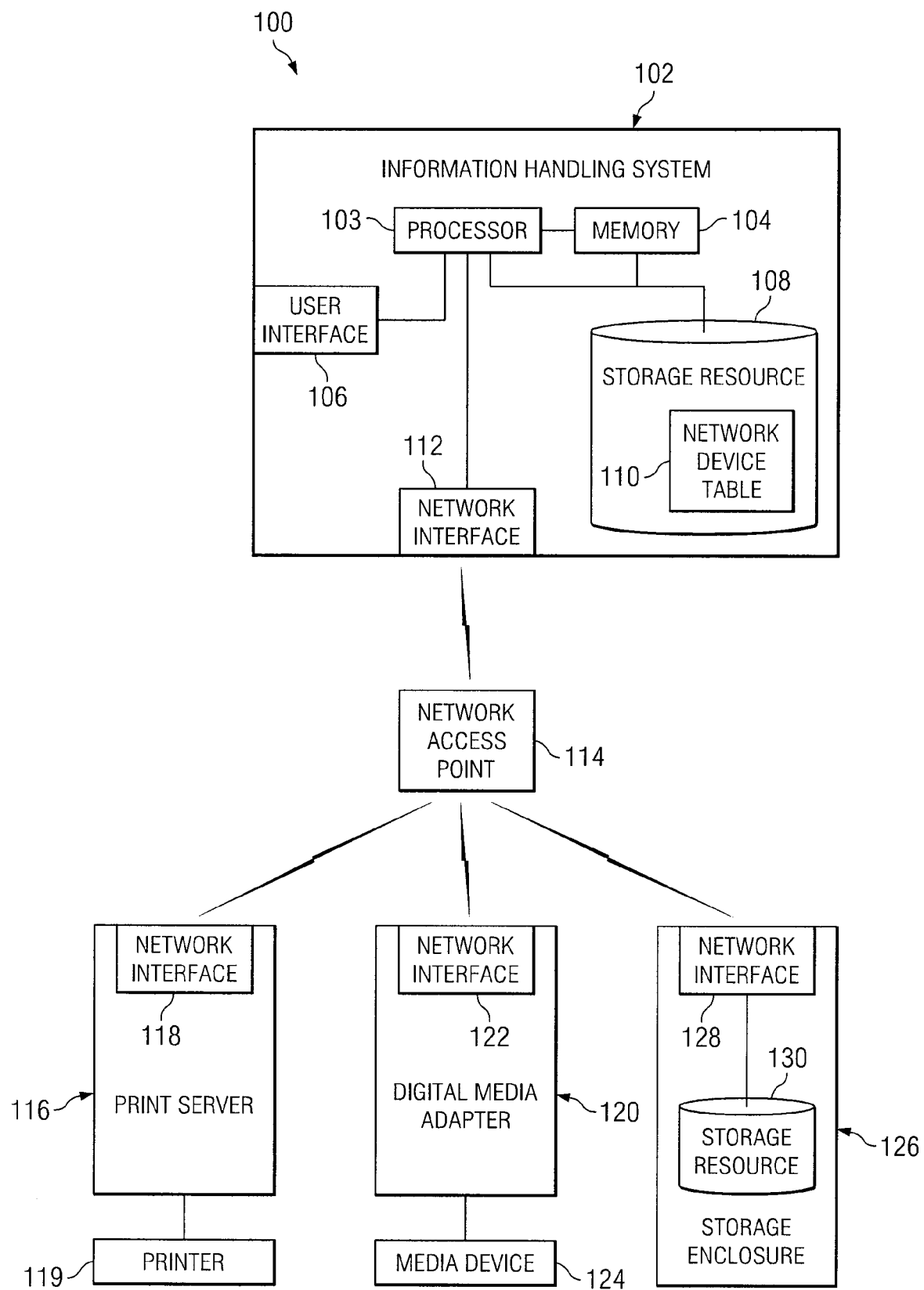
FIG. 1 illustrates a block diagram of an example network system, in accordance with an embodiment of the present disclosure.

Preferred embodiments and their advantages are best understood by reference to FIGS. 1-4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

For the purposes of this disclosure, the term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, Ethernet cabling (10baseT, 100baseT, etc.), coaxial cables, T-1 lines, T-3 lines, ISDN lines, ADSL, and/or any other suitable medium.

For the purposes of this disclosure, the term "wireless transmissions" may be used to refer to all types of electromagnetic communications which do not require a wire, cable, or other types of conduits. Examples of wireless transmissions which may be used include, but are not limited to, personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

Examples of wireless transmissions for use in local area networks (LAN) include, but are not limited to, radio frequencies, especially the 900 MHZ and 2.4 GHz bands, for example IEEE 802.11 and BLUETOOTH, as well as infrared, and laser. Examples of wireless transmissions for use in wide area networks (WAN) include, but are not limited to, narrowband personal communications services (nPCS), personal communication services (PCS such as CDMA, TMDA, GSM) circuit switched cellular, and cellular digital packet data (CDPD), etc.

FIG. 1 illustrates a block diagram of an example network system 100, in accordance with an embodiment of the present disclosure. As depicted, system 100 may include an information handling system 102, a network access point 114, a print server 116, a printer 119, a digital media adapter 120, a media device 124, and a storage enclosure 126.

Information handling system 102 may generally be operable to receive data from, and/or transmit data to print server 116, digital media adapter 120, storage enclosure 126, and/or another device via network access point 114. In one embodiment, information handling system 102 may be a personal computer adapted for home use. In the same or alternative embodiments, information handling system 102 may be a personal computer adapted for business use. As shown in FIG. 1, information handling system 102 may include a processor 103, a memory 104 communicatively coupled to processor 103, a user interface 106, a local storage resource 108, and a network interface 112.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 108, and/or another component of information handling system 102.

Memory 104 may be communicatively coupled to processor 103 and may comprise any system, device, or apparatus operable to retain program instructions or data for a period of time (e.g., computer-readable media). Memory 104 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to information handling system 102 is turned off.

User interface 106 may be communicatively coupled to processor 103 and may include any instrumentality or aggregation of instrumentalities by which a user may interact with information handling system 102. For example, user interface 106 may permit a user to input data and/or instructions into information handling system 102 (e.g., via a keyboard, pointing device, and/or other suitable means), and/or otherwise manipulate information handling system 102 and its associated components. User interface 106 may also permit information handling system 102 to communicate data to a user, e.g., by means of a display device.

Local storage resource 108 may be communicatively coupled to processor 103 and/or memory 104 and may include any system, device, or apparatus operable to retain program instructions or data for a period of time (e.g., computer-readable media) and that retains data after power to information handling system 102 is turned off. Local storage resource 108 may include one or more hard disk drives, magnetic tape libraries, optical disk drives, magneto-optical disk drives, compact disk drives, compact disk arrays, disk array controllers, and/or any computer-readable medium operable to store data. As depicted in FIG. 1, storage resource 108 may include a network device table 110. Network device table 110 may include any database or other data structure operable to store data (e.g., Media Access Control (MAC) address, serial number, manufacturer, model number, encryption key, and/or other unique identifier) regarding network devices (e.g., network access point 114, print server 116, digital media adapter 120, storage enclosure 126) communicatively coupled to or to be communicatively coupled to information handling system 102, as described in greater detail below.

Network interface 112 may include any suitable system, apparatus, or device operable to serve as an interface between information handling system 102 and network access point 114. Network interface 112 may enable information handling system 102 to communicate via network access point 114 using any suitable transmission protocol (e.g., TCP/IP) and/or standard (e.g., IEEE 802.11, Wi-Fi). In certain embodiments, network interface 112 may include a network interface card (NIC). In the same or alternative embodiments, network interface 112 may be configured to communicate with network access point 114 via wireless transmissions. In the same or alternative embodiments, network interface 112 may provide physical access to a networking medium and/or provide a low-level addressing system (e.g., through the use of Media Access Control addresses). In certain embodiments, network interface 112 may include a buffer for storing packets received from network access point 114 and/or a controller configured to process packets received by network access point 114.

Network access point 114 may include any system, device or apparatus operable to communicatively couple one or more devices together to form a network. Network access point 114 may be a part of a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). For example, network access point 114 may be configured to communicate with other devices via wireless transmissions, and thus may communicatively couple a plurality of wireless communication devices together to form a wireless network. Network access point 114 may also be configured to communicate to one or more devices via wire-line transmissions, and thus may relay data among wireless devices and wired devices. Network access point 114 may be configured to communicate with other devices via any suitable communication protocol (e.g., TCP/IP) and/or standard (e.g., IEEE 802.11, Wi-Fi).

Print server 116 may include any system, device or apparatus configured to accept print jobs from an information handling system (e.g., information handling system 102) communicatively coupled to print server 116 and communicate such print jobs to an imaging device (e.g., printer 119) communicatively coupled to print server 116.

In certain embodiments, print server 116 may include network interface 118. Network interface 118 may include any suitable system, apparatus, or device operable to serve as an interface between print server 116 and network access point 114. Network interface 118 may enable print server 116 to communicate via network access point 114 using any suitable transmission protocol (e.g., TCP/IP) and/or standard (e.g., IEEE 802.11, Wi-Fi). In certain embodiments, network interface 118 may include a network interface card (NIC). In the same or alternative embodiments, network interface 118 may be configured to communicate with network access point 114 via wireless transmissions. In the same or alternative embodiments, network interface 118 may provide physical access to a networking medium and/or provide a low-level addressing system (e.g., through the use of Media Access Control addresses). In certain embodiments, network interface 118 may include a buffer for storing packets received from network access point 114 and/or a controller configured to process packets received by network access point 114.

Digital media adapter 120 may include any system, device, or apparatus configured to couple a media device (e.g., television, stereo, DVD player, home entertainment system, and/or other consumer electronic device) to a network. Thus, digital media adapter 120 may allow a user to play media (e.g., movies, music, pictures) stored on information handling system 102 through the user's home entertainment system (e.g., media device 124).

In certain embodiments, digital media adapter 120 may include network interface 122. Network interface 122 may include any suitable system, apparatus, or device operable to serve as an interface between digital media adapter 120 and network access point 114. Network interface 122 may enable digital media adapter 120 to communicate via network access point 114 using any suitable transmission protocol (e.g., TCP/IP) and/or standard (e.g., IEEE 802.11, Wi-Fi). In certain embodiments, network interface 122 may include a network interface card (NIC). In the same or alternative embodiments, network interface 122 may be configured to communicate with network access point 114 via wireless transmissions. In the same or alternative embodiments, network interface 122 may provide physical access to a networking medium and/or provide a low-level addressing system (e.g., through the use of Media Access Control addresses). In certain embodiments, network interface 122 may include a buffer for storing packets received from network access point 114 and/or a controller configured to process packets received by network access point 114.

Media device 124 may be any system, device or apparatus configured to play and/or display media (e.g., movies, music, pictures). Media device 124 may include one or more television, stereo, DVD player, home entertainment system, and/or other consumer electronic device.

Storage enclosure 126 may be configured to hold and power storage resource 130. Storage enclosure 126 may be communicatively coupled to network access point 114 to facilitate communication of data between information handling system 102 and storage resource 130. Storage resource 130 may include a hard disk drive, magnetic tape library, optical disk drive, magneto-optical disk drive, compact disk drive, compact disk array, disk array controller, other computer-readable media, and/or any other system, apparatus or device operable to store media. Although FIG. 1 depicts storage enclosure 126 having only one storage resource 130, storage enclosure 126 may include any number of storage resources 130.

In certain embodiments, storage enclosure 126 may include network interface 128. Network interface 128 may include any suitable system, apparatus, or device operable to serve as an interface between storage enclosure 126 and network access point 114. Network interface 126 may enable storage enclosure 126 to communicate via network access point 114 using any suitable transmission protocol (e.g., TCP/IP) and/or standard (e.g., IEEE 802.11, Wi-Fi). In certain embodiments, network interface 128 may include a network interface card (NIC). In the same or alternative embodiments, network interface 128 may be configured to communicate with network access point 114 via wireless transmissions. In the same or alternative embodiments, network interface 128 may provide physical access to a networking medium and/or provide a low-level addressing system (e.g., through the use of Media Access Control addresses). In certain embodiments, network interface 128 may include a buffer for storing packets received from network access point 114 and/or a controller configured to process packets received by network access point 114.

Although FIG. 1 depicts information handling system 102, print server 116, digital media adapter 120, and storage enclosure 126 communicatively coupled to network access point 114, any suitable number and/or type of devices may be communicatively coupled to network access point 114.

As mentioned above, while network systems such as network system 100, for example, have become more popular, user difficulty in configuring such networks has prevented widespread acceptance and has contributed to numerous technical support calls and poor customer experience. To address these shortcomings, the present disclosure provides systems and methods whereby a network system may be configured with little or no input from the user, thus reducing or eliminating configuration difficulties.

Figure 2:
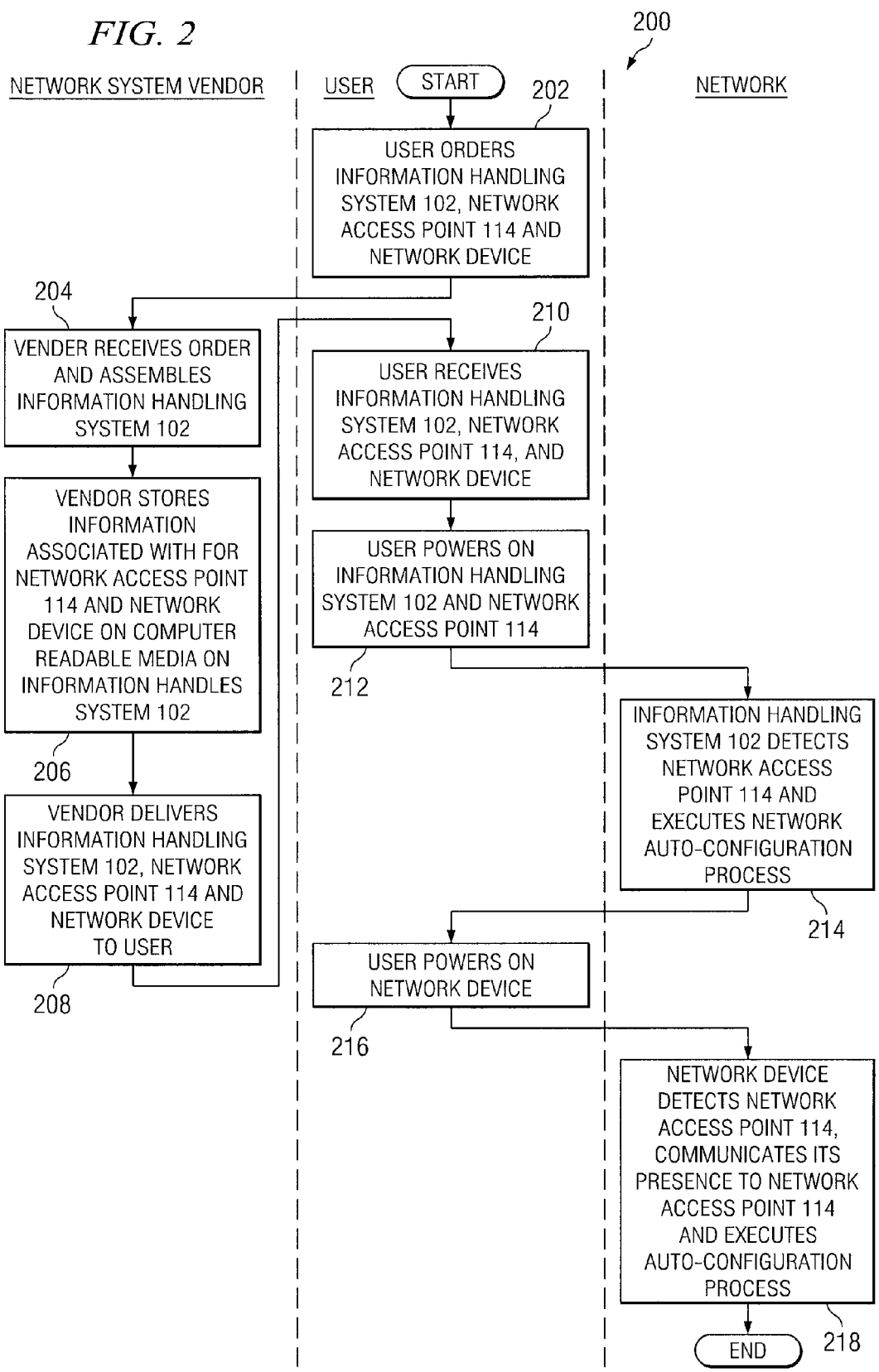
FIG. 2 illustrates a flow chart of a method for a network system configuration process, in accordance with an embodiment of the present disclosure.

For example, FIG. 2 illustrates a flow chart of a method 200 for a network system configuration process, in accordance with an embodiment of the present disclosure. According to one embodiment, method 200 preferably begins at step 202. As noted above, teachings of the present disclosure may be implemented in a variety of configurations of system 100. As such, the preferred initialization point for method 200 and the order of the steps 202-218 comprising method 200 may depend on the implementation chosen.

At step 202, a user may order information handling system 102, network access point 114, a network device (e.g., print server 116, digital media adapter 120, and/or storage enclosure 126), and/or other devices configured to operate in connection with information handling system 102. For example, a user may access a website for online ordering of an information handling system from a manufacturer and/or vendor. For purposes of simplicity and clarity, the term "vendor" may be used herein to refer to a vendor, seller, manufacturer, wholesaler, or other provider of information handling systems, network access points, network devices, and/or related equipment. In another embodiment, a user may place an order by contacting a vendor via telephone and/or other suitable means. In certain embodiments, one or more of information handling system 102, network access point 114, and the ordered network device may be configured to communicate via wireless transmissions.

At step 204, a vendor may receive the order and assemble information handling system 102 in accordance with the user's order. In other embodiments, a vendor may procure the ordered information handling system 102 from a third-party manufacturer. At step 206, the vendor may store information associated with network access point 114 and the ordered network device (e.g., Media Access Control (MAC) addresses, serial numbers, manufacturers, model numbers, and/or other unique identifiers) on a computer-readable medium of information handling system 102. For example, such information may be stored on network device table 110 of storage resource 108. In certain embodiments, the information stored at step 206 may include an encryption key for network access point 114 and/or each ordered network device that may serve to encrypt and/or decrypt configuration messages transmitted between information handling system 102 and network access point 114. The encryption key for a network access point or a network device may include or may be based on the MAC address of the device, the serial number of the device, the manufacturer of the device, the model number of the device, and/or a cryptographic hash of one or more of the foregoing.

At step 208, the vendor may deliver information handling system 102, network access point 114, the ordered network devices, and other ordered equipment to the user. At step 210, a user, which may or may not be the same user described with reference to step 202 above, may receive information handling system 102, network access point 114, the ordered network devices, and other ordered equipment.

At step 212, the user may power on information handling system 102 and network access point 114. At step 214, information handling system 102 may detect the presence of network access point 114 and execute a network auto-configuration process, e.g., the auto-configuration process described below in reference to FIG. 3.

At step 216, the user may power on the ordered network device. At step 218, the network device may detect the presence of network access point 114 and execute another network auto-configuration process, e.g., the auto-configuration process described below in reference to FIG. 4. After completion of step 218, method 200 may end.

Although FIG. 2 discloses a particular number of steps to be taken with respect to method 200, it is understood that method 200 may be executed with greater or lesser steps than those depicted in FIG. 2. In addition, although FIG. 2 discloses a certain order of steps to be taken with respect to method 200, the steps comprising method 200 may be completed in any suitable order. For example, in certain embodiments, steps 212 and 214 may executed before, after, or substantially contemporaneous with steps 216 and 218.

Method 200 may be implemented using system 100 or any other system operable to implement method 200. In certain embodiments, method 200 may be implemented partially or fully in software embodied in tangible computer-readable media.

Figure 3:
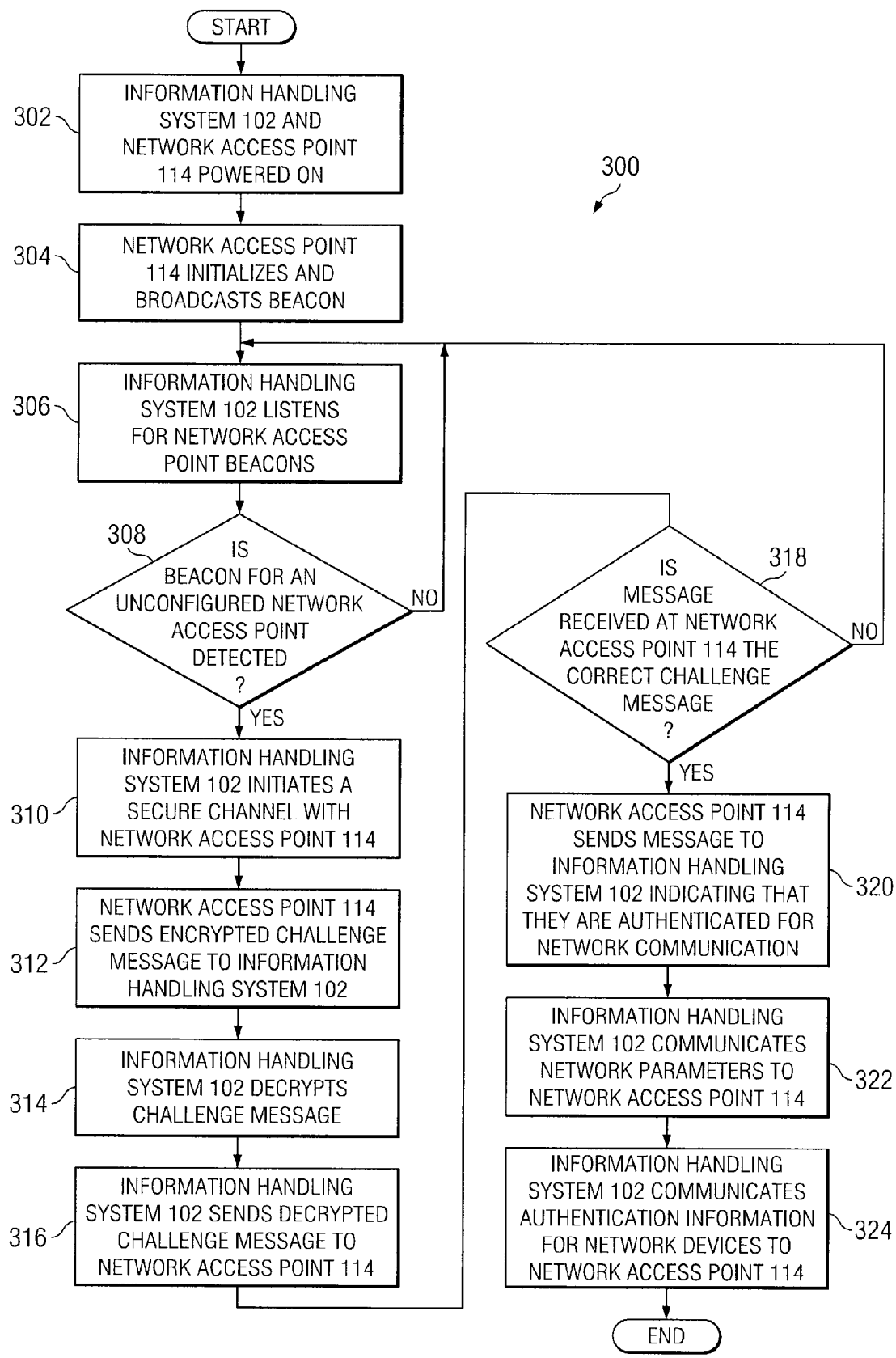
FIG. 3 illustrates a flow chart of a method for a network system configuration process between an information handling system and a network access point, in accordance with an embodiment of the present disclosure.

FIG. 3 illustrates a flow chart of a method 300 for a network system configuration process between information handling system 102 and network access point 114, in accordance with an embodiment of the present disclosure. According to one embodiment, method 300 preferably begins at step 302. As noted above, teachings of the present disclosure may be implemented in a variety of configurations of system 100. As such, the preferred initialization point for method 300 and the order of the steps 302-324 comprising method 300 may depend on the implementation chosen.

At step 302, a user may receive and power on information handling system 102 and network access point 114. In certain embodiments, one or both of information handling system 102 and network access point 114 may be configured to communicate via wireless transmissions. At step 304, network access point 114 may initialize and broadcast a beacon and/or other message to signal to other network-capable equipment its presence.

At step 306, information handling system 102 may listen for network access point beacons. At step 308, if information handling system 102 detects a beacon for an unconfigured network access point (e.g., network access point 114), method 300 may proceed to step 310. Otherwise, if information handling system 308 does not detect a beacon for an unconfigured network access point, method 306 may be repeated until an unconfigured access point is detected.

At step 310, information handling system 102 may initiate a secure channel with newly-detected network access point 114. In certain embodiments, the secure channel may use a Diffe-Hellman key exchange protocol or other suitable means of establishing a secure communication channel between information handling system 102 and network access point 114. At step 312, network access point 114 may send an encrypted challenge message to information handling system 102. In certain embodiments, challenge message may be encrypted using an encryption key that may include or may be based on the MAC address of network access point 114, the serial number of network access point 114, the manufacturer of network access point 114, the model number of network access point 114, and/or a cryptographic hash of one or more of the foregoing.

At step 314, information handling system 102 may attempt to decrypt the encrypted challenge message. In certain embodiments, information handling system 102 may use an encryption key identical or related (e.g., private/public key pair) to the encryption key used to encrypt the challenge message. In the same or alternative embodiments, the encryption key may be stored on a computer-readable medium of information handling system 102 (e.g., network device table 110 of storage resource 108) and information handling system 102 may read the encryption key from the computer-readable medium in order to decrypt the challenge message. The encryption key may include or may be based on the MAC address of network access point 114, the serial number of network access point 114, the manufacturer of network access point 114, the model number of network access point 114, and/or a cryptographic hash of one or more of the foregoing. In some embodiments, information handling system 102 may use information about network access point 114 embedded in the challenge message to pick the appropriate cryptographic key from network device table 110 for the decryption of the challenge message.

At step 316, information handling system 102 may communicate the decrypted challenge message to network access point 114. At step 318, network access point 114 may determine whether the decrypted challenge message sent by information handling system 102 is equivalent to the challenge message originally sent by network access point 114 to information handling system 102. If the received decrypted challenge message is equivalent, indicating that information handling system 102 and network access point 114 have matching or related encryption keys (and thus are to be configured as part of the same network), method 300 may proceed to step 320. Otherwise, if the challenge message sent by information handling system 102 is not equivalent to the challenge message originally sent by network access point 114 to information handling system 102, indicating that information handling system 102 and network access point 114 do not have matching encryption keys (and thus are not to be configured as part of the same network), method 300 may proceed again to step 306 where information handling system may listen for other network access point beacons.

At step 320, network access point 114 may communicate a message to information handling system 102 indicating that they are authenticated to communicate to one another in a network. In response, information handling system 102 may, at step 322, communicate network parameters to network access point 114 (e.g., service set identifiers (SSIDs), wireless encryption protocol (WEP) keys, and/or other parameters related to network communication and network security) in order to facilitate network communication, including secured network communication, between information handling system 102 and network access point 114.

At step 324, information handling system 102 may communicate authentication information (e.g., encryption keys, MAC addresses, serial numbers, manufacturers, model numbers, and/or other identifying information) for network devices (e.g., print server 116, digital media adapter 120, storage enclosure 126, and/or other network devices) to network access point 114, to facilitate configuration of such network devices, as discussed in greater detail below with respect to FIG. 4. After completion of step 324, method 300 may end.

Although FIG. 3 discloses a particular number of steps to be taken with respect to method 300, it is understood that method 300 may be executed with greater or lesser steps than those depicted in FIG. 3. In addition, although FIG. 3 discloses a certain order of steps to be taken with respect to method 300, the steps comprising method 300 may be completed in any suitable order. For example, in certain embodiments, step 304 may executed before, after, or substantially contemporaneous with step 306.

Method 300 may be implemented using system 100 or any other system operable to implement method 300. In certain embodiments, method 300 may be implemented partially or fully in software embodied in tangible computer-readable media.

Figure 4:
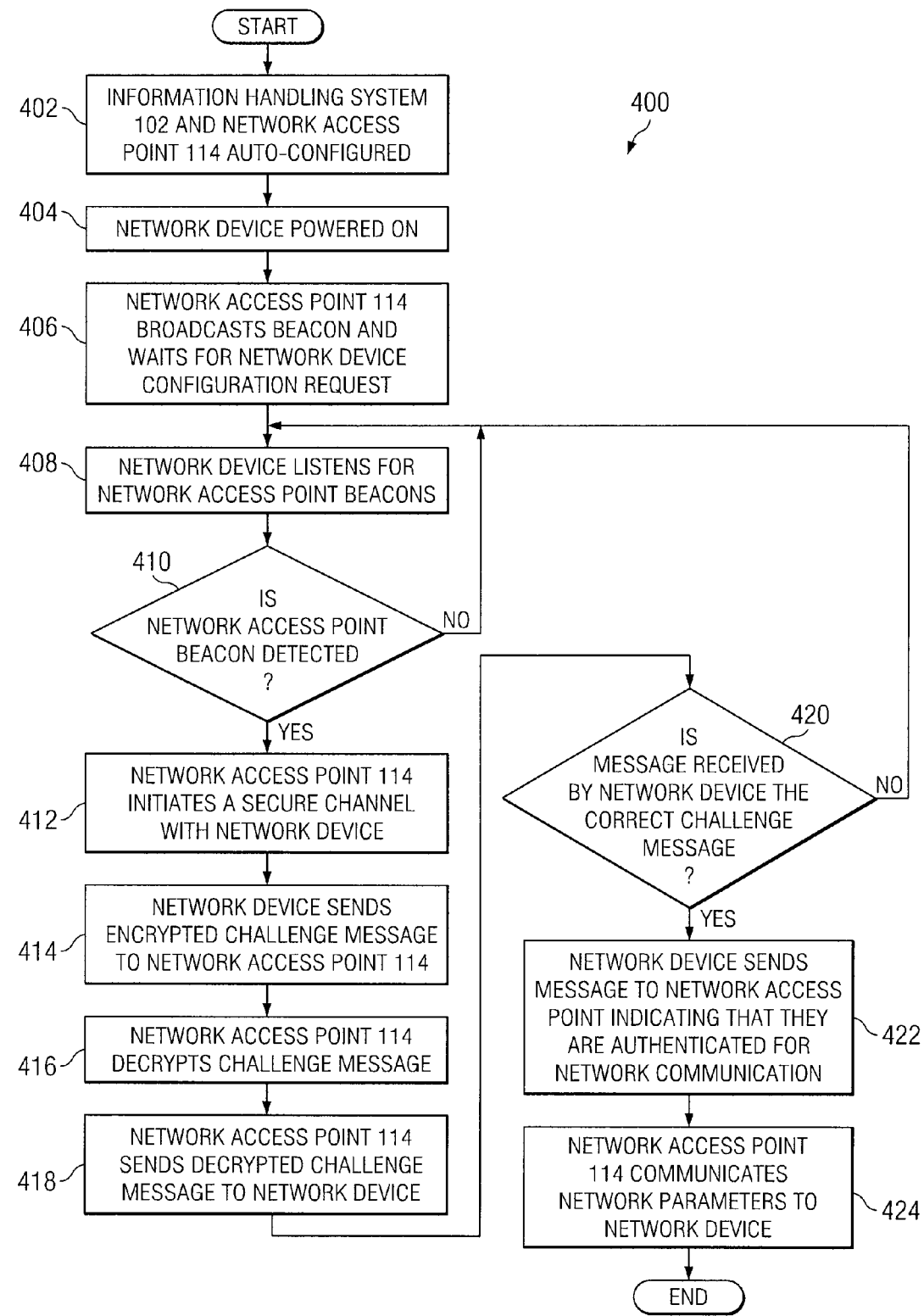
FIG. 4 illustrates a flow chart of a method for a network system configuration process between a network access point and a network device, in accordance with an embodiment of the present disclosure.

FIG. 4 illustrates a flow chart of a method 400 for a network system configuration process between network access point 114 and a network device (e.g., print server 116, digital media adapter 120, storage enclosure 126), in accordance with an embodiment of the present disclosure. According to one embodiment, method 400 preferably begins at step 402. As noted above, teachings of the present disclosure may be implemented in a variety of configurations of system 100. As such, the preferred initialization point for method 400 and the order of the steps 402-424 comprising method 400 may depend on the implementation chosen.

At step 402, information handling system 102 and network access point 114 may be configured as described above with respect to FIG. 3. At step 404, a user may power on a network device (e.g., print server 116, digital media adapter 120, storage enclosure 126, or other network device). In certain embodiments, the network device may be configured to communicate via wireless transmissions.

At step 406, network access point 114 may broadcast a beacon and/or other message to signal to network devices its presence and may wait for a configuration request from a network device. At step 408, the network device may listen for network access point beacons.

At step 410, if the network device detects a beacon for a network access point (e.g., network access point 114), method 400 may proceed to step 412. Otherwise, if the network device does not detect a beacon for a network access point, method 408 may be repeated until a network access point is detected.

At step 412, network access point 114 may initiate a secure channel with the network device. In certain embodiments, the secure channel may use a Diffe-Hellman key exchange protocol or other suitable means of establishing a secure communication channel between information handling system 102 and network access point 114. At step 414, the network device may send an encrypted challenge message to network access point 314. In certain embodiments, the encryption key used to encrypt the challenge message may include or may be based on the MAC address of the network device, the serial number of the network device, the manufacturer of the network device, the model number of the network device, and/or a cryptographic hash of one or more of the foregoing.

At step 416, network access point 114 may attempt to decrypt the encrypted challenge message. In certain embodiments, network access point 114 may use a encryption key identical or related to the encryption key used to encrypt the challenge message. In the same or alternative embodiments, the encryption key may be stored on a computer-readable medium of network access point 114 (e.g., a memory) and network access point 114 may read the encryption key from the computer-readable medium in order to decrypt the challenge message. In the same or alternative embodiments, the encryption key may comprise information communicated from information handling system 102 to network access point 114 during network configuration of information handling system 102 and network access point 114 (e.g., step 324 of method 300). The encryption key may include or may be based on the MAC address of the network device, the serial number of the network device, the manufacturer of the network device, the model number of the network device, and/or a cryptographic hash of one or more of the foregoing. In some embodiments, network access point 114 may use information about the network device embedded in the challenge message to pick the appropriate cryptographic key from network device table 110 for the decryption of the challenge message.

At step 418, network access point 114 may communicate the decrypted challenge message to the network device. At step 420, the network device may determine whether the decrypted challenge message sent by network access point 114 is equivalent to the challenge message originally sent by the network device to the network access point 114. If the decrypted challenge message is equivalent, indicating that network access point 114 and the network device have matching encryption keys (and thus are to be configured as part of the same network), method 400 may proceed to step 422. Otherwise, if the challenge message sent by network access point 114 is not equivalent to the challenge message originally sent by the network device to network access point 114, indicating that network access point 114 and the network device do not have matching encryption keys (and thus are not to be configured as part of the same network), method 400 may proceed again to step 408 where an attempt may made to auto-configure another network device.

At step 422, the network device may communicate a message to network access point 114 indicating that they are authenticated to communicate to one another in a network. In response, network access point 114 may, at step 424, communicate network parameters to the network device (e.g., service set identifiers (SSIDs), wireless encryption protocol (WEP) keys, and/or other parameters related to network communication and network security) in order to facilitate network communication, including secured network communication, between network access point 114 and the network device. In the embodiment depicted in FIG. 4, method 400 may end after completion of step 424. However, in another embodiment, method 400 may proceed again to step 404, to permit auto-configuration of another network device.

Although FIG. 4 discloses a particular number of steps to be taken with respect to method 400, it is understood that method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using system 100 or any other system operable to implement method 400. In certain embodiments, method 400 may be implemented partially or fully in software embodied in tangible computer-readable media.

Although the methods discussed above contemplate auto-configuration of network devices, network access points, and information systems contemporaneously ordered by a user, methods similar or identical to those set forth herein may be used to auto-configure after-ordered network devices and network access points for use with an information handling system. For example, in one embodiment, a vendor accepting an order for such an after-ordered network device or network access point may send an email or other message to the user that may write an encryption key related to such after-ordered device to network device table 110. In another embodiment, a vendor accepting an order for such an after-ordered network device or network access point may post an encryption key related to such after-ordered device to a web site accessible to the user (e.g., via a username and/or password), and such website, when accessed, may write the encryption key to network device table 110.

Although the term "network device" has been used herein to refer to a network device configured to be communicatively coupled to an information handling system via a network access point, the term may be applied to any device operable to interface to a network, including without limitation, information handling systems and network access points.

Using the methods and systems disclosed herein, a network system may be provided that allows for the auto-configuration of network components, with little or no input from a user, thus reducing or eliminating difficulties associated with network configuration.

Although the present disclosure has been described in detail, it should be understood that various changes, substitutions, and alterations can be made hereto without departing from the spirit and the scope of the invention as defined by the appended claims.

What is claimed is:

1. A system for configuring a network comprising:
   a network access point operable to broadcast a message to signal the presence of the network access point; and
   an information handling system communicatively coupled to the network access point via a wireless transmission and including a computer-readable medium having stored thereon identifying information associated with one or more network devices communicatively coupled to the network access point, the identifying information being stored in the computer-readable medium prior to delivery to a user, and the information handling system operable to:
      listen for the message to signal the presence of the network access point; and
      in response to detecting the message to signal the presence of the network access point, initiating a secure communication channel with the network access point;
   wherein the network access point encrypts a challenge message based on identifying information associated with the network access point and communicates the encrypted challenge message to the information handling system via the secure communication channel;
   wherein the information handling system receives the encrypted challenge message from the network access point, decrypts the encrypted challenge message based on the identifying information stored on the computer-readable medium, and communicates the decrypted challenge message to the network access point;
   wherein at least one of the network access point and the information handling system determines whether the information handling system is associated with the network access point; and wherein the network access point and the information handling system cooperate to automatically configure, via the wireless transmission, network parameters for communication among the network access point, network devices and the information handling system in response to a determination that the identifying information stored on the information handling system is associated with the network access point.

2. A system according to claim 1, wherein:
the network access point is further operable to:
   determine whether the decrypted challenge message matches the challenge message communicated by the network access point; and
   communicate a message to the information handling system indicating that the decrypted challenge message matches the challenge message communicated by the network access point; and
the information handling system is further operable to automatically configure network parameters for communication between the network access point and the information handling system in response to the message indicating that the decrypted challenge message matches the challenge message communicated by the network access point.

3. A system according to claim 1, wherein the network parameters for communication between the network access point and the information handling system comprise at least one of a service set identifier (SSID) and a wireless encryption protocol (WEP) key.

4. A system according to claim 1, wherein the identifying information is based at least on one or more of a Media Access Control (MAC) address of the network access point, a serial number of the network access point, a manufacturer of the network access point, a model number of the network access point.

5. A system according to claim 1, further comprising a network device communicatively coupled to the network access point, wherein:
the information handling system is operable to communicate the identifying information stored on the computer-readable medium to the network access point; and
the network access point and the network device are operable to automatically configure network parameters for communication between the network access point and the network device in response to a determination that the identifying information communicated from the information handling system to the network access point is associated with the network device.

6. A system according to claim 5, further comprising:
the network device further operable to:
encrypt a challenge message based on identifying information associated with the network device; and
communicate the encrypted challenge message to the network access point;
the network access point further operable to:
decrypt the encrypted challenge message based on the identifying information communicated from the information handling system to the network access point; and
communicate the decrypted challenge message to the network device.

7. A system according to claim 6, wherein:
the network device is further operable to:
   determine whether the decrypted challenge message matches the challenge message communicated by the network device; and
   communicate a message to the network access point indicating that the decrypted challenge message matches the challenge message communicated by the network device; and
the network access point is further operable to automatically configure network parameters for communication between the network access point and the network device in response to the message indicating that the decrypted challenge message matches the challenge message communicated by the network device.

8. A system according to claim 5, wherein at least one of the information handling system, the network access point, and the network device is configured to communicate via wireless transmissions.

9. A method for configuring a network comprising:
storing identifying information associated with one or more network devices on a computer-readable medium in an information handling system prior to delivery of the information handling system to a user;
listening for a message to signal the presence of a network access point;
initiating, in response to the message to signal the presence of the network access point, a secure communication channel with the network access point;
receiving an encrypted challenge message at the information handling system from a network access point;
decrypting the encrypted challenge message based on the identifying information stored on the computer-readable medium;
communicating the decrypted challenge message to the network access point; and
automatically configuring, via a wireless transmission, network parameters for communication among the network access point, network devices and the information handling system in response to the message indicating that the decrypted challenge message matches the challenge message communicated by the network access point.

10. A method according to claim 9, wherein the network parameters for communication between the network access point and the information handling system comprise at least one of a service set identifier (SSID) and a wireless encryption protocol (WEP) key.

11. A method according to claim 9, wherein the identifying information is based at least on one or more of a Media Access Control (MAC) address of the network access point, a serial number of the network access point, a manufacturer of the network access point, a model number of the network access point.

12. A method according to claim 9, further comprising:
communicating the identifying information stored on the computer-readable medium to the network access point; and
automatically configuring network parameters for communication between the network access point and the network device in response to a determination that the identifying information communicated from the information handling system to the network access point is associated with the network device.

13. A method according to claim 12, further comprising:
receiving an encrypted challenge message at the network access point from the network devices;
decrypting the encrypted challenge message based on the identifying information communicated from the information handling system;
communicating the decrypted challenge message to the network device; and automatically configuring network parameters for communication between the network access point and the network device in response to the message indicating that the decrypted challenge message matches the challenge message communicated by the network access point.

14. An information handling system, comprising:
a processor; and
a computer-readable medium communicatively coupled to the processor and having data stored thereon prior to delivery to a user, the data including:
identifying information associated with one or more network devices; and
a program of instructions operable to:
listen for a message to signal the presence of a network access point; and
in response to the message to signal the presence of the network access point, initiate a secure communication channel between the information handling system and the network access point;
receive an encrypted challenge message at the information handling system from the network access point;
decrypt the encrypted challenge message based on the identifying information stored on the computer-readable medium;
communicate the decrypted challenge message to the network access point; and
automatically configure, via a wireless transmission, network parameters for communication among the network access point, network devices and the information handling system in response to the message indicating that the decrypted challenge message matches the challenge message communicated by the network access point.

15. An information handling system according to claim 14, wherein the network parameters for communication between the network access point and the information handling system comprise at least one of a service set identifier (SSID) and a wireless encryption protocol (WEP) key.

16. An information handling system according to claim 14, wherein the identifying information is based at least on one or more of a Media Access Control (MAC) address of the network access point, a serial number of the network access point, a manufacturer of the network access point, a model number of the network access point.

17. An information handling system according to claim 14, the program of instructions further operable to communicate the identifying information stored on the computer-readable medium to the network access point.

* * * * *